S. D. AND H. G. IRWIN.
ROTARY CULTIVATOR.
APPLICATION FILED JULY 12, 1919.

1,322,447.

Patented Nov. 18, 1919.
2 SHEETS—SHEET 1.

Inventors
S. D. Irwin
H. G. Irwin

By

Attorneys

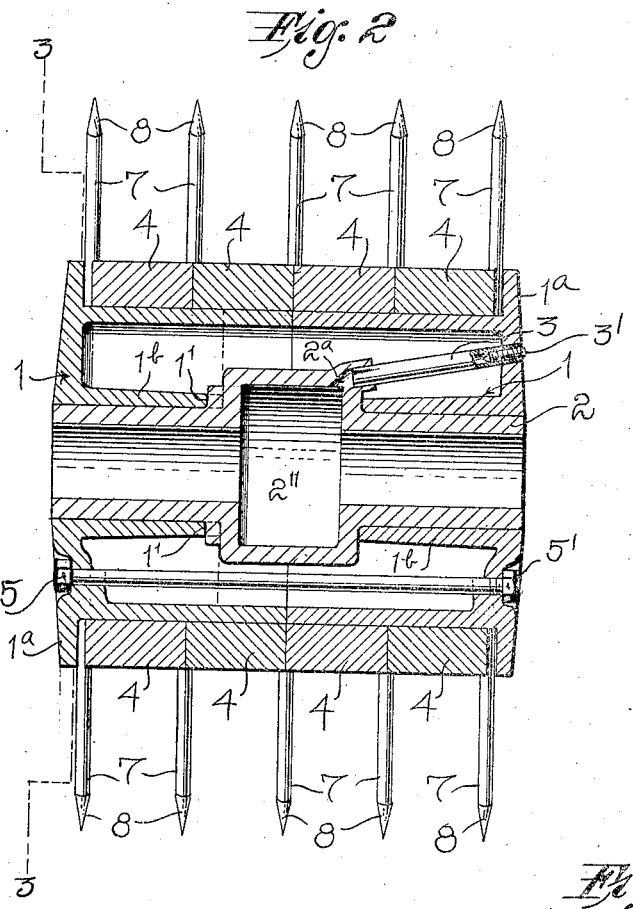

UNITED STATES PATENT OFFICE.

SAMUEL D. IRWIN AND HERBERT G. IRWIN, OF FLOYDADA, TEXAS.

ROTARY CULTIVATOR.

1,322,447.  Specification of Letters Patent.  Patented Nov. 18, 1919.

Application filed July 12, 1919. Serial No. 310,307.

*To all whom it may concern:*

Be it known that we, SAMUEL D. IRWIN and HERBERT G. IRWIN, citizens of the United States, residing at Floydada, in the county of Floyd and State of Texas, have invented certain new and useful Improvements in Rotary Cultivators; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in rotary cultivators, and consists in the provision of means whereby the soil, when in a crusty form, due to baking of the surface after a rain, may be pulverized without injury to the tender plants.

The invention consists of a simple and efficient device of this nature, comprising essentially a cylindrical tooth holder, in which the teeth are adapted to be held at different inclinations, as may be desired, so that the teeth when rotating point forward and will have a more or less prying effect on the soil, according to their adjustment.

Our invention is illustrated in the accompanying drawings which, with the letters of reference marked thereon, form a part of this application, and in which:

Fig. 2 is a central longitudinal sectional view through the same.

Fig. 4 is an enlarged detail view of one end of the ring in which the teeth are held.

Fig. 5 is a plan view of the cylindrical member having angled grooves for the reception of teeth.

Figure 1:
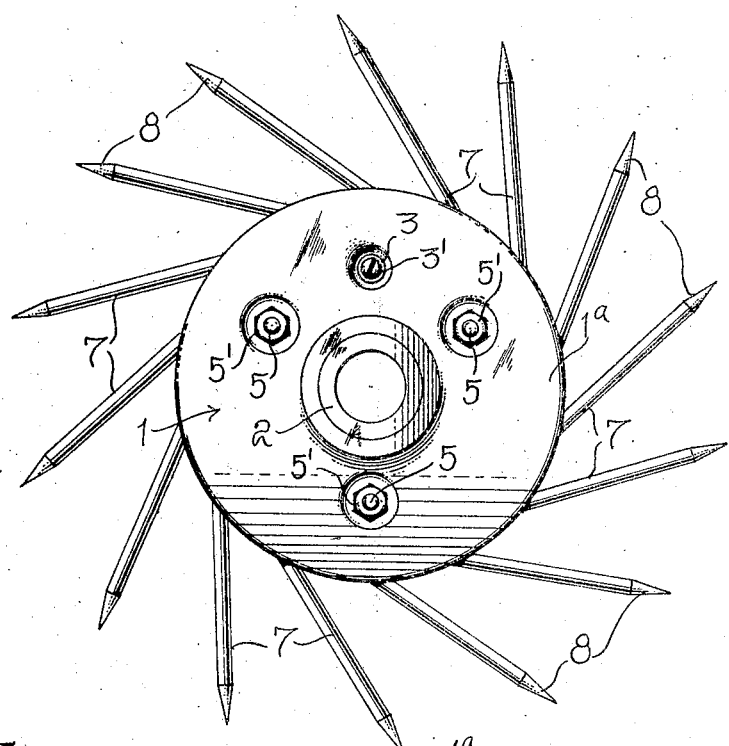
Figure 1 is an end view of the cultivator.
Figure 3:
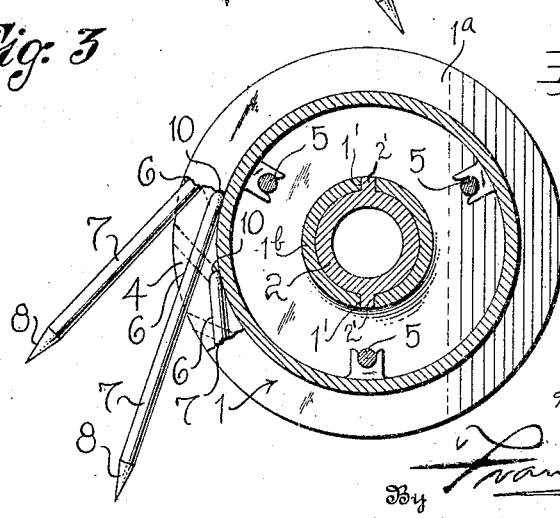
Fig. 3 is a sectional view on line 3—3 of Fig. 2.
Figure 6:
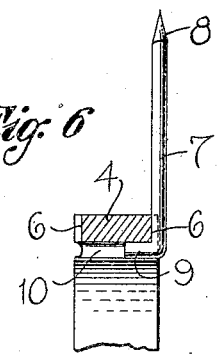
Fig. 6 is an enlarged view in section showing the manner of attachment to the tooth thereof.

Reference now being had to the details of the drawings by numerals:

1, 1 designate two cylindrical drum sections with a circumferential flange 1ª at the outer ends thereof, and each section has a hub portion 1ᵇ notched as at 1′ to receive a projection 2′ formed upon the enlarged portion of the wall of the bearing 2. The enlarged portion of said bearing, designated by numeral 2″ forms a reservoir for oil and has a duct 2ª leading through the wall thereof, which communicates with a pipe 3 leading through the end of one of the drum sections, the entrance to which is closed by a plug 3′ and into which oil may be introduced and which will run into the oil reservoir and lubricate the bearing as the drum rotates.

Spacing rings 4 fit over the cylindrical drum sections, which latter are held together by means of bolts 5 passing through registering apertures in the drum sections, and held by means of bolts 5′, the heads of the bolts and nuts being countersunk in recesses in the drum heads, as shown in the drawings. The several rings are provided with diagonal grooves 6 and which are semi-cylindrical in cross section and which are adapted to receive the shank portions of the teeth 7, having points 8.

Said grooves or recesses are formed in the opposite edges of the rings and in the inner circumferences thereof, as shown in the drawings. The ends of the shank portions of the teeth are bent at right angles, as at 9, adapted to engage the recesses 10 formed in the inner circumferences of the rings.

By the construction shown, it will be noted that the teeth may be adjusted so as to be held at different inclinations if desired, and by placing them in the grooves inclined at different angles on opposite sides of the spacing rings, they will have a more or less prying effect on the soil and completely pulverizing the crust formed on the surface, due to the baking by the sun after a rain.

What we claim to be new is:

1. A rotary cultivator, comprising two complemental cylindrical flanged sections, a bearing upon which the same are mounted, the latter having an oil duct therein, a series of rings about the circumferences of said sections and provided with recesses disposed at inclinations, and teeth clamped in said recesses between said rings, and means for holding the sections and rings together.

2. A rotary cultivator, comprising two complemental cylindrical flanged sections, a bearing upon which the same are mounted, the latter having an oil duct therein, a series of rings about the circumferences of said sections and provided with recesses disposed at inclinations, and teeth clamped in said recesses between said rings, bolts passing through registering apertures in the ends of said cylindrical sections for holding the parts together.

3. A rotary cultivator, comprising two complemental cylindrical flanged sections, a bearing upon which the same are mounted, the latter having an oil duct therein, a series of rings about the circumferences of said sections and provided with recesses disposed at inclinations, and teeth clamped in said recesses between said rings, and between the outer rings and the flanges of said sections.

4. A rotary cultivator, comprising two complemental cylindrical flanged sections, each having a hub portion with notches in the inner ends thereof, a bearing having an enlarged central portion, the wall of which is provided with projections engaging said notches, an oil feed tube leading into said enlarged portion of the bearing, a series of rings about said cylindrical sections, and provided with inclined recesses in the opposite edges of the rings, teeth retained by recesses in said rings, and bolts passing through the cylindrical sections and holding the parts together and the teeth in clamping relation with the rings.

5. A rotary cultivator, comprising two complemental cylindrical flanged sections, each having a hub portion with notches in the inner ends thereof, a bearing having an enlarged central portion the wall of which is provided with projections engaging said notches, an oil feed tube leading into said enlarged portion of the bearing, a series of rings about said cylindrical sections, and provided with inclined recesses in the opposite edges of the rings and inner circumference, teeth retained by recesses in the edges of the rings, and having angled ends, and bolts for holding the sections and rings in clamping relation with the teeth.

In testimony whereof we hereunto affix our signatures.

SAMUEL D. IRWIN.
HERBERT G. IRWIN.